March 3, 1953 — J. M. SLATER — 2,630,017
ACCELERATION CORRECTION OF GYRO-VERTICALS
Filed June 29, 1946 — 2 SHEETS—SHEET 1

INVENTOR
JOHN M. SLATER
BY Herbert H. Thompson
his ATTORNEY.

March 3, 1953  J. M. SLATER  2,630,017
ACCELERATION CORRECTION OF GYRO-VERTICALS
Filed June 29, 1946  2 SHEETS—SHEET 2

INVENTOR
JOHN M. SLATER
BY
Herbert H. Thompson
his ATTORNEY.

Patented Mar. 3, 1953

2,630,017

UNITED STATES PATENT OFFICE 2,630,017

ACCELERATION CORRECTION OF GYRO-VERTICALS

John M. Slater, Garden City, N. Y., assignor to The Sperry Corporation, a corporation of Delaware Application June 29, 1946, Serial No. 680,499
In Great Britain March 13, 1946

14 Claims. (Cl. 74—5.47)

This invention relates to gyro-verticals or gyroscopic artificial horizons designed for use on moving craft such as ships or aircraft. As described in prior application Serial No. 388,736 of Frederick D. Braddon for Gyro-Verticals filed April 16, 1941 and in the joint application Serial No. 566,568 of said Frederick D. Braddon and Walter Wrigley for Inclined Gyroscopic Horizons, filed December 4, 1944, it is now known that turn errors of the ordinary aircraft gyro-vertical which is erected by torques brought into action by and proportional to tilt (or more precisely to the lateral acceleration force, of which the tilt angle is a tangent function) and applied about a horizontal axis normal to the axis of tilt, may be mitigated by forwardly inclining the gyroscope at the correct angle. Such correction, however, as heretofore proposed is only partial, since for any particular design this correction is only complete if, when the turn takes place, the airplane is flying at the predetermined air speed for which the instrument is designed.

In the prior solution also, while the error due to turn is mitigated, no complete correction was secured for the error due to changes of speed of the craft, so that in the prior case the gyro is disturbed by the changes in speed of the craft and deviation is caused due to linear acceleration forces.

According to the present invention, it is proposed not only to cure the turn error for all ordinary air speeds, but also to cure the change-of-speed error by one and the same means and in one and the same operation.

(1) The basic law governing the removal of the turn error in this type of gyro-vertical may be simply stated as follows:

$$\alpha = \frac{KS}{\omega Mg}$$

where $\alpha$ = the angle of inclination of the gyro,
$K$ = the erecting torque gradient, that is, the ratio of the erecting torque to inclination,
$S$ = the speed of the craft,
$\omega$ = the rotor speed,
$M$ = its moment of inertia, and
$g$ = the acceleration of gravity.

Hence, for curing the turn error, $\omega$ may be varied directly with $S$, $\alpha$ may be varied directly with $S$, or $K$ may be varied inversely with $S$.

It may also be shown mathematically and experimentally that the change of speed error may also be cured simultaneously if such variations in $\omega$ or $\alpha$ be made simultaneously with and proportionally to the change of speed. In other words, the reaction on the gyroscope having a component about the fore-and-aft axis in accelerating or decelerating the rotor (or forcing a change in $\alpha$) applies a torque sufficient to oppose and prevent an oscillation being set up by the erection device due to the action of acceleration forces thereon at the time.

According to my invention, I provide means for providing an erection torque, about each gyro axis, substantially proportional to the centrifugal and the linear accelerations as detected by the erection gravity references, and for changing the gyro inclination ($\alpha$) from its normal inclination at cruising speeds to a greater or lesser inclination proportional to the change of speed or to a function thereof. If this change takes place during the time that the craft is changing speed and at a proportional rate, it will cure both turn and linear acceleration errors for reasons pointed out above. This may be done by providing means for shifting the relationship between the gravitational or pendulous controller and the gyroscope.

Obviously a gyroscope having an inclined axis may be regarded as made up of two components, namely, one vertical and one inclined to the vertical or having a horizontal component. In other words, instead of inclining the main gyro-vertical, the above results may also be accomplished by making the gyro unit into two components, one a main unit which remains vertical at all times and an auxiliary, preferably smaller, gyroscope mounted on the main gyro-vertical with a fore-and-aft inclination (or component) with respect to the vertical axis of the main gyro. In this manner the gyro unit as a whole has in effect a forward inclination; that is, it has a component about the fore-and-aft axis of the craft so that it behaves in a manner similar to a single gyro with an inclined axis. Assuming proportional erection as described, a correction for the turn error and change-speed error could then be secured for all air speeds, bank angles and rates of turn by varying the inclination of the auxiliary gyro only, by the same means described above, leaving the main gyro undisturbed. This purpose may be accomplished as by adjustably mounting the auxiliary gyro about a transverse gimbal axis on the main gyro so that the forward inclination of its inclined axis may be changed from normal inclination at normal cruising speeds to a greater or less inclination proportional to a function of the increase or decrease of air speed.

In the drawings several forms of my invention are disclosed,

Figure 1:
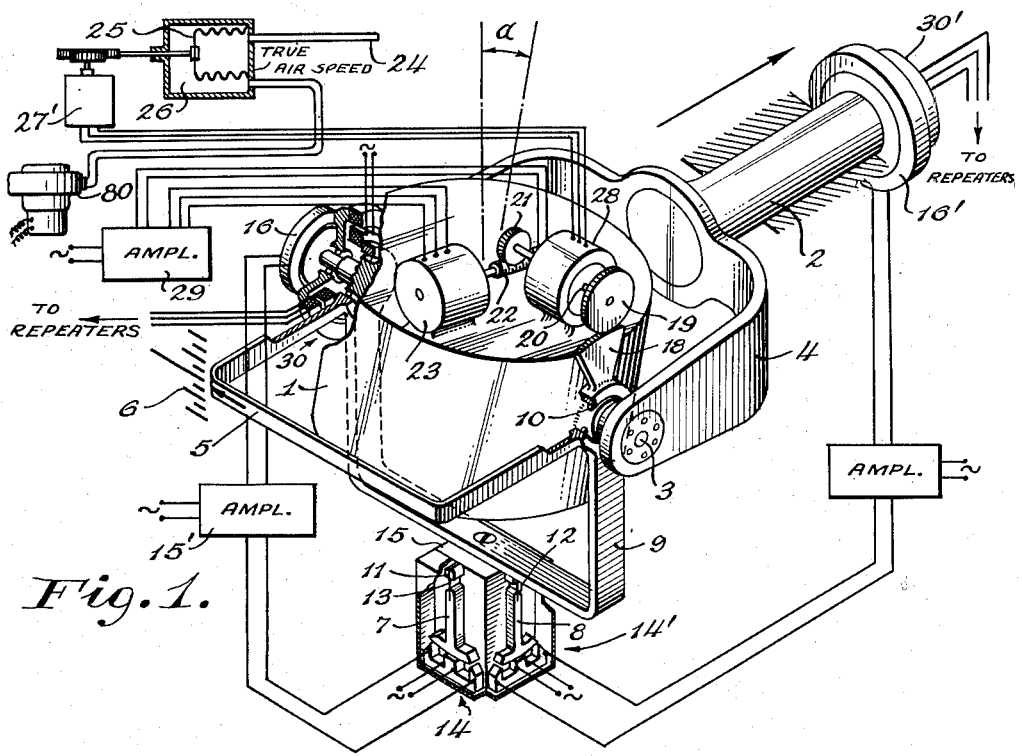
Fig. 1 is a perspective view partly in section of a form of my invention embodying a single gyroscopic structure.

The gyroscopic structure in all figures is shown as enclosed in a casing 1 mounted for freedom on the craft about a fore-and-aft trunnion axis 2 and a lateral trunnion axis 3. While the gyroscopic structure usually preferably comprises but a single gyroscope with its spin axis at an angle ($a$) to the vertical such structure may, of course, comprise a plurality of gyroscopes as both types of gyro-verticals are well known (see Patent No. 1,236,993 to Sperry and Tanner). The gimbal ring 4 external on said fore-and-aft axis 2 is shown as cut away at the front or U-shaped to furnish an unobstructed view of the indicating portion of the instrument, which in this case is shown as a horizon bar 5 readable on a pitch scale 6 and a roll scale (not shown). The gravitational erection device for this gyroscope is shown as comprising a pair of pendulums 7, 8 pivoted on a bail structure 9 which in turn is pivotally mounted on gimbal 4.

Preferably, such structure is journalled independently of the gyroscope about the lateral axis 3 as by means of bearings 10 so as to permit of adjustment about this axis to change the relation between the pendulous structure and the gyroscope. The pendulum 7, is shown pivoted about a fore-and-aft axis 11, while the pendulum 8 is pivoted about a lateral axis 12. In order to secure a torque proportional to the lateral acceleration acting on the device, I prefer that both pendulums 7 and 8 be pivoted by a restraining means such as a leaf spring 13 so as to greatly restrain their lateral movement during turns and change of speed and to cause such movement to be substantially proportional to the amount of lateral acceleration force, of which the tangent of the banking or tilt angle is a measure during turns. My control devices, therefore, act more as accelerometers than pendulums, although still responsive to gravity. My gravitational responsive controllers therefore constitute a great improvement on the pendulous controllers of the prior art insofar as this invention is concerned, since the pick-offs on the pendulums of the prior art devices give a response substantially proportional to the angle of tilt or bank, while my invention gives a response proportional to the lateral acceleration force acting, which in turn is represented by the tangent of the tilt or bank angle, rather than the angle itself. For small acceleration forces, that is, small bank angles, both systems give approximately the same result, but for lateral acceleration forces approaching and above $g$, my improved device gives greatly superior results, and is necessary for the proper functioning of the invention as a whole, in high speed aircraft.

A signal transformer or pick-off 14 is mounted under the pendulum on a frame 15 secured to the bail 9, to give a signal proportional to the relative inclination of the pendulum and bail. This transformer may be of the well-known three-fingered type giving an A. C. output proportional to the relative tilt of the spring-restrained pendulum and gyroscope from norm, and reversible in phase with the direction of displacement. This output, after passing through phase sensitive amplifier 15', is applied to a suitable type of torque applying motor 16, acting about transverse axis 3 to apply a torque on the gyroscope proportional to the lateral acceleration force. Similarly, the pick-off device 14' of the spring-restrained pendulum 8 controls the exertion of a proportional torque about the fore-and-aft axis by the torquer 16'.

As aforesaid the relation between the bail 9 and the gyroscope is made adjustable in accordance with the air speed. For this purpose, the bail 9 is shown as having thereon a gear sector 18 meshing with a gear 19 on shaft 20 journalled on the gyroscope. Said shaft is normally locked in position against turning by an irreversible worm wheel 21 thereon meshing with the worm 22 on the shaft of a motor 23. Rotation of the motor, however, will turn the shaft and hence change the relation between bail 9 and the gyroscope.

Means are provided to operate the motor in accordance with changes of air speed of the craft. Preferably, the device is so designed that the gyroscope is normally held at the proper angle ($a$) for the cruising or normal air speed of the craft and this angle is varied up or down in accordance with the departure of such air speed from such normal value. The air speed measuring device is shown diagrammatically as a Pitot tube arrangement 24 with the open end facing the air stream and connected to the interior of a bellows 25 within a chamber 26 connected to a constant speed, motor-driven pump 80, of the centrifugal type. Such a pump will supply to the chamber 26 a static pressure which varies inversely with altitude or air density, so that the movement of the bellows instead of being responsive to indicated air speed, as is a standard air speed indicator, is responsive to true air speed. Such an arrangement is shown in the patent to Hanson No. 2,391,896 dated January 1, 1946. Movement of said bellows 25 turns a transmitter, such as a selsyn transmitter 27' electrically connected with a selsyn signal generator or transformer 28 on said shaft 21. Therefore, any rotation of transmitter 27' will cause a signal to be generated in the transformer 28, the output of which is amplified in the phase sensitive amplifier 29 and operates the aforesaid motor 23 to turn shaft 21 and hence readjust the position of the transformer 28 and bail 9.

It should be noted that as shown the horizon indicating member 5 is mounted on the bail 9 rather than on the gyro casing 1, since it is the bail 9 which remains horizontal at all times although the inclination of the gyro is altered for different air speeds. It is obvious that other known forms of horizon indicators may be used in place of the horizon bar 5, such as a sphere with markings thereon as shown at S' in Fig. 3 and in prior application Serial No. 566,568. The bail 9 may also be used to transmit the pitch indications to a distance. For this purpose I have shown a selsyn transmitter 30 with its field mounted on the ring 4 and its armature on bail 9. Likewise roll may be transmitted from a transmitter 30'.

Figure 2:
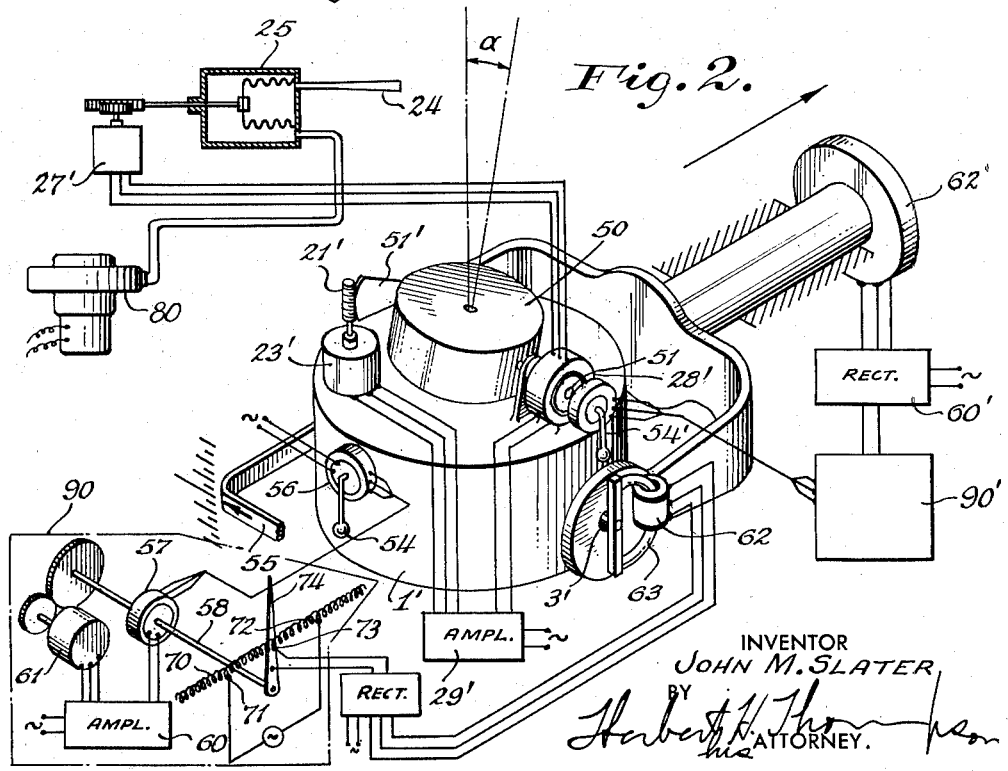
Fig. 2 is a similar view of a form of my invention employing a main gyroscopic structure and an auxiliary gyro mounted thereon.
Figure 3:
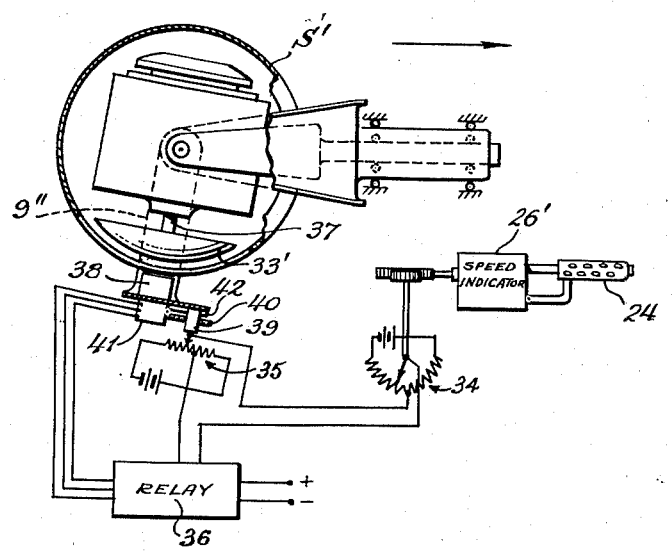
Fig. 3 shows a side elevation of a modified form of a single gyroscope, employing a different type of erector and different means for changing the inclination than that of Fig. 1.

Another method of varying the relation between the gyroscope and the gravitational controller is shown in Fig. 3. In this figure, the eddy current disc 33' is continuously spun by being mounted on extension 37 of the rotor shaft of the gyro rotor (not shown) and a constant magnetic field is set up by a permanent or electro magnet 38 pendulously mounted under the gyroscope on bail 9" as shown in Figs. 2 and 3 of aforesaid prior application Serial No. 566,568. In this case the center of gravity of pendulum 38 is shifted with air speed to change the position of the gyro. For this purpose there is shown a mass 39 adjustably mounted in the fore-and-aft direction on the pendulum. As shown, the mass is threaded on a shaft 40 of reversible motor 41 and is held against rotation by key way 42 so that when the motor 41 is rotated the mass is adjusted in a fore-and-aft direction. The motor 41 is shown as controlled in this case by potentiometers 34 and 35 through relay 36. The movable arm of center tapped potentiometer 35 is positioned by the mass 39. The movable arm of center tapped potentiometer 34 is positioned by the gearing connection for the same to the speed measuring device indicated at 24. The bridge circuit connecting the potentiometers is such that relay 36 causes operation of the motor 41 only when the arms of the respective potentiometers departs from balancing position to operate motor 41 in a direction to restore the balance. The horizon indicator in this instance is also shown as a sphere S' again mounted on bail 9".

As indicated above, my invention may assume a form in which the forward inclination of the gyro unit is secured by means of an auxiliary gyroscope mounted on a main gyro with a fore-and-aft inclination. Such a modification is shown in Fig. 2 which also illustrates certain further possible modifications of my invention. The main gyro structure 1' is mounted as shown in Fig. 1. The auxiliary gyroscope 50 (of which only the rotor casing is shown) is journalled on a transverse precession or trunnion axis 51, so that the spin axis may be forwardly inclined at the proper angle ($\alpha$). The angle ($\alpha$) is adjustable by a reversible motor 23' geared through a worm gearing 21' to a gear section 51' on the trunnion of the gyro 50. The motor is shown as governed from an air speed responsive device 25 as in the other figures, having a selsyn transmitter 27' connected with a selsyn signal generator 28' as in Fig. 1, the output of which operates, through a phase sensitive amplifier 29', the motor 23'. In this case the horizon indicator 55 is connected directly to the gyro casing 1' since the main gyro remains vertical.

A somewhat different form of tilt or acceleration responsive controller is shown in this figure. A small free pendulum 54 is shown pivoted on a fore-and-aft axis on the gyro casing 1'. The pendulum hence always points to the apparent vertical, that is, in a direction which is resultant of gravity and centrifugal force. This pendulum may therefore be used to apply a torque proportional to tilt ($\theta$), but preferably to the tangent of such angle for reasons explained above. For this purpose, I have shown the pendulum as operating a selsyn transmitter 56 connected with a special pick-off device 90 including selsyn signal generator 57 on a shaft 58. The output of the signal generator is amplified by an amplifier 60 and applied to a follow-up motor 61 in a conventional manner, so that shaft 58 follows the tilt of the pendulum. The shaft operates a tangent computing transmitting device, shown as comprising an inductive winding of autotransformer type 70 energized between two spaced taps 71, 72 and having a center tap 73. A pivoted slider 74 on shaft 58 normally occupies the position shown, the output of the device being zero. The distance between the axis of shaft 58 and the center tap is made equal to the distance between the center tap 73 and either of the taps 71 or 72. This geometrical relation insures that the output voltage across tap 73 and slider 74 is proportional to the tangent of the angle of rotation of shaft 58 and hence to tan $\theta$. With the proportions shown in this drawing the working range is obviously much greater than that of Fig. 3. The output of the computer is amplified in a conventional manner to yield a reversible polarity D. C. which is utilized for controlling a solenoid 62 for applying reversible torques on a polarized armature 63 connected to the transverse trunnion 3' of the gyro 1'.

The manner in which the effect of linear accelerations on the pendulums is compensated will be apparent from the following description. Assume that the craft increases speed. During the acceleration ($dS/dt$) the pitch pendulum 54' which controls torquer 62' through tangent device 90' and rectifier 60', leans backward and causes a torque to be applied to the gyroscope. Since the erection signal is proportional to the acceleration (due to the presence of the tangent computing device), the erection torque is proportional to ($dS/dt$)/$g$. It is required that the auxiliary gyro furnish an equal and opposite torque. The following expression gives the conditions that need to be met in order to compensate for longitudinal acceleration:

$$\frac{dS}{dt}(M\omega \sin \alpha) = K\frac{dS}{dt} \times \frac{1}{g}$$

By integration, $$M\omega \sin \alpha = K\frac{S}{g} + \text{constant}$$

(The constant is zero in the apparatus shown.) The auxiliary gyro is made large enough so that ($\alpha$) is always small, so that the foregoing expression reduces itself to the following, since the sine of a small angle is substantially equal to the angle.

$$M\omega\alpha = K\frac{S}{g} \text{ or } \alpha = \frac{KS}{M\omega g}$$

The roll erection torque developed in a turn, assuming that the erector is proportional as described, is proportional to the centrifugal acceleration $a = \phi S$ where $\phi$ is rate of turn about a vertical axis. The condition to be met is $$(M\omega \sin \alpha)\phi = K\frac{\phi S}{g}$$

or, $\alpha$ being small, $$\alpha = \frac{KS}{M\omega g}$$

This expression is identical with that for compensation of longitudinal accelerations. In other words, the auxiliary gyro compensates for both accelerations. The same is true, of course, in the other figures where a component of the inclination of the single gyroscope acts in lieu of the auxiliary gyroscope.

Figure 4:
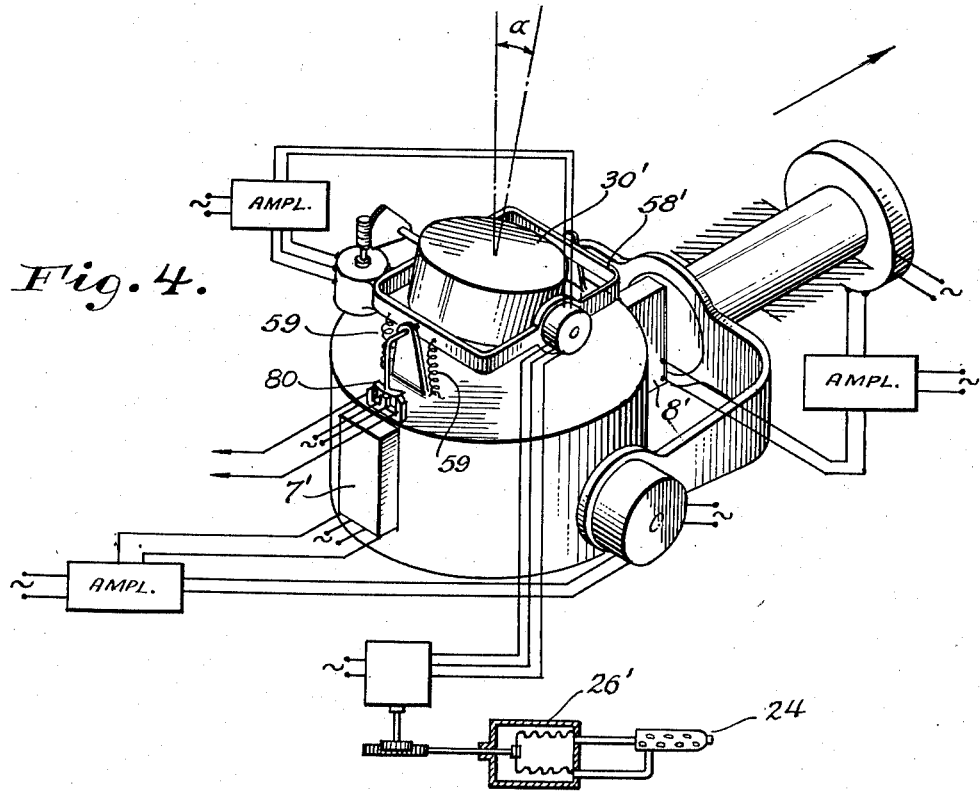
Fig. 4 shows a different application of my invention for securing a signal proportional to the amount of the lateral acceleration (centrifugal) force, which is proportional to the product of speed and rate of turn.

A somewhat different use of the principles of my invention using a main and auxiliary gyroscope is illustrated in Fig. 4. Assuming proportional erection, the torque exerted through the auxiliary gyroscope on the main gyroscope during turns is proportional to the centrifugal force acting during turns. In other words, it is proportional to the rate of turn multiplied by the speed of the craft. In this figure, I propose to secure a measure of this force and to transmit the same for use in applying corrections to any type of apparatus where such correction factor may be found useful. The auxiliary gyroscope 30' in this figure may be constructed with the type of air speed control as in Fig. 2, but means are provided to secure a signal proportional to the torque exerted thereby on the main gyroscope. For this purpose the auxiliary gyroscope is shown as mounted in a gimbal ring 58' journalled on a fore-and-aft axis on the main gyroscope which ring, however, is anchored by stiff springs 59 to the main gyroscope. Hence, during turns the force exerted between the two gyroscopes about the fore-and-aft axis will result in a small tilt of the gimbal 58' which may be measured by any suitable type of sensitive pick-off or transmitter 80, and transmitted to a distance as a signal representing the centrifugal force of the turn.

It is interesting to note that the same general effect would be true as to the torque exerted between the main and auxiliary gyroscopes if instead of changing the inclination of the auxiliary gyroscope with changes of speed of the craft, the rotor speed were changed during such change of speed of the craft.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. Thus, while I have shown pendulums as gravitationally responsive controllers for erecting the gyroscope, it will be understood that other types of gravitational devices may be used, if desired, such as liquid levels.

What is claimed is:

1. An electrically erected gyro-vertical for moving craft having a case journalling a rotor on a spin axis slightly inclined to the vertical, a universal support for the case, a two-part eddy current erecting means, one part being independently and pendulously mounted under said case and the other part mounted above the first part to move with said case, an eccentric mass on said pendulous part, and means for adjusting the eccentricity of said mass with changes in speed of the craft.

2. A gravitationally controlled power erection device for gyro-verticals for moving craft, comprising a pendulum supported on the gyro-vertical by spring means, said spring means centralizing and reducing the tilt angle of such pendulum, and signal generating means controlled by said pendulum providing a signal proportional to a tangent function of the tilt of the pendulum relative to the gyro-vertical to control the erection device so as to cause a torque on the gyro proportional thereto through a wide angle of tilt.

3. A gravitationally controlled power erection device for gyro-verticals for moving craft, as claimed in claim 2, in which the pendulum is supported on the gyro by means of a vertical leaf spring, one end of which is anchored to the gyro-vertical.

4. A gravitationally controlled power erection device for gyro units for moving craft, comprising a mass mounted for movement substantially athwartship on the unit, resilient means for opposing movment of said mass in either of two directions with a force proportional to displacement of said mass, pick-off means for generating a signal reversible in sign and proportional to displacement of said mass, and a reversible torque applying means for applying torque, on said unit in response to said signal, about the athwartship axis.

5. A gyro-vertical for dirigible craft having a gyro unit with a rotor spin axis normally forwardly inclined about an axis athwartship of the craft, an erection device for the gyro vertical including a pendulous reference and a member related to the reference whose position relative to the gyro unit is adjustable to change the forward inclination of the unit, means for measuring the speed of the craft, and means operatively connecting said speed measuring means and the member of the erection device to control the adjustment thereof.

6. A gyro-vertical for dirigible craft including an erection device having a gravitationally responsive controller, a gyro unit mounted with freedom about a normally horizontal axis athwartship of the craft whose normal operating position is forwardly inclined about the athwartship horizontal axis with a vertical component and a horizontal component parallel to the fore and aft axis of the craft at an angle corresponding to a predetermined speed of the craft, means for measuring the speed of the craft, and means operatively connecting said speed measuring means and gyro unit through said erection device to vary the angle of forward inclination of the unit and thereby change the horizontal component thereof with departure of the craft from the predetermined speed.

7. A gyro vertical for dirigible craft having a gyro unit with a rotor spin axis normally forwardly inclined about an axis athwartship of the craft, an erection device for the gyro vertical including a pendulum and a member adjustable about the athwartship axis of the gyro unit supporting said pendulum, means for measuring the speed of the craft, and means operatively connecting said speed measuring means and said member to adjust the forward inclination of the gyro unit in accordance with the speed of the craft.

8. A gyro vertical as claimed in claim 7 including a pitch indicator positioned by said adjustable member.

9. A gyro vertical for dirigible craft having a gyro unit with a rotor spin axis normally forwardly inclined about an axis athwartship of the craft, an erection device for the gyro vertical for applying torques on the gyro at right angles to relative tilt including a pendulum, an adjustable mass on said pendulum for varying its rearward inclination, means for measuring the speed of the craft, and means operatively connecting said speed measuring means and said mass to adjust the inclination of the pendulum and gyro-vertical in accordance with the speed of the craft.

10. An erection system for a gyro vertical adapted to be mounted on a moving vehicle comprising an eddy current conductor member, a magnet member, one of said members being mounted on said gyro and the other of said members being mounted on a pendulum, means on said pendulum for adjusting the rearward inclination thereof, means for relatively rotating said members whereby eddy current drag torques are produced tending to precess said gyro to the position determined by said pendulum, said members being arranged so that said gyro is erected to a normal position in which the spin axis tips from the vertical in the direction of movement of the vehicle, means for measuring the speed of the craft, and means operatively connecting said speed measuring means and pendulum adjusting means to vary the inclination of said pendulum and thereby compensate the gyro for turns and speed changes of the vehicle.

11. In a universally mounted gyro-vertical of the forwardly inclined type for dirigible craft, a member mounted on the gyro-vertical for adjustment about an athwartship axis relative to the craft, a spring restrained pendulum on said member, means controlled by the relative displacement of said member and pendulum about the fore and aft axis for applying a torque about the athwartship axis of the gyro-vertical proportional to such displacement, and means responsive to speed of the craft for changing the relation between the gyro-vertical and member about the athwartship axis.

12. A gyro-vertical as claimed in claim 11, including a pitch indicating means mounted on said member, showing the correct pitch attitude regardless of changes in the forward inclination of the gyro-vertical.

13. In a universally mounted gyro-vertical for aircraft of the forwardly inclined type, a gravitational reference device mounted adjacent to the gyro, but offset therefrom to cause a forward normal tilt of the gyro, power means responsive to relative tilt of said device and gyro from normal for applying erection torques proportional to and at right angles to said tilt to maintain the gyro at its normal forward inclination, and to be vertical laterally, and means responsive to the increase in airspeed of the craft for increasing the offset of said gravitation device to increase said inclination with increase in such airspeed and thereby maintain the gyro substantially free of turn and acceleration errors.

14. In a universally mounted aircraft gyro-vertical of the forwardly inclined type, a member mounted on the gyro for adjustment about an athwartship axis relative to the craft, spring restrained pendulums pivoted on said member about athwartship and fore and aft axes, torque devices controlled by the relative tilt of said pendulums and member for applying erecting torque to the gyro about axes normal to such tilt axes, and means responsive to the speed of the craft for changing the relation between the gyro-vertical and member about said athwartship axis to change the forward inclination, whereby both turn errors and change of speed errors are prevented.

JOHN M. SLATER.

REFERENCES CITED

The following references are of record in the file of this patent:

UNITED STATES PATENTS

| Number | Name | Date |
| --- | --- | --- |
| 1,932,210 | Glitscher | Oct. 24, 1933 |
| 2,005,530 | Boykow | June 18, 1935 |
| 2,202,987 | Egenas | June 4, 1940 |
| 2,278,379 | Koster | Mar. 31, 1942 |
| 2,366,543 | Meredith | Jan. 2, 1945 |
| 2,409,659 | Braddon | Oct. 22, 1946 |
| 2,419,063 | Fischer | Apr. 15, 1947 |

FOREIGN PATENTS

| Number | Country | Date |
| --- | --- | --- |
| 439,630 | Great Britain | Dec. 11, 1935 |